(12) United States Patent
Senger (10) Patent No.: US 12,180,799 B2
(45) Date of Patent: Dec. 31, 2024

(54) STUFFING BOX WITH PRESSURIZED FLUID CHAMBER AND RELATED METHODS

(71) Applicant: OIL LIFT TECHNOLOGY INC., Calgary (CA)

(72) Inventor: Ross Willard Senger, Airdrie (CA)

(73) Assignee: Oil Lift Technology Inc., Calgary (CA)

( * ) Notice: Subject to any disclaimer, the term of this patent is extended or adjusted under 35 U.S.C. 154(b) by 65 days.

(21) Appl. No.: 17/754,750

(22) PCT Filed: Dec. 14, 2021

(86) PCT No.: PCT/CA2021/051795
§ 371 (c)(1),
(2) Date: Apr. 11, 2022

(87) PCT Pub. No.: WO2022/126250
PCT Pub. Date: Jun. 23, 2022

(65) Prior Publication Data
US 2023/0349256 A1    Nov. 2, 2023

(51) Int. Cl.
*E21B 33/02*    (2006.01)
(52) U.S. Cl.
CPC .................................. *E21B 33/02* (2013.01)
(58) Field of Classification Search
CPC ...................................................... E21B 33/02
See application file for complete search history.

(56) References Cited

U.S. PATENT DOCUMENTS

| 4,425,838 A | 1/1984 | Pippert |
| 6,394,461 B1 | 5/2002 | Henderson |
| 6,843,313 B2 * | 1/2005 | Hult ........................ E21B 33/08 |
| | | 166/84.1 |
| 7,669,650 B2 | 3/2010 | Cayford |
| 9,151,135 B2 | 10/2015 | Eriksen |

FOREIGN PATENT DOCUMENTS

CA    2436924 C  *  9/2010   ........... E21B 33/085

OTHER PUBLICATIONS

International Searching Authority, International Search Report and Written Opinion mailed on Aug. 30, 2021, issued in connection with International Patent Application No. PCT/CA2020/051795, filed on Dec. 23, 2020, 10 pages.

* cited by examiner

*Primary Examiner* — Matthew R Buck
(74) *Attorney, Agent, or Firm* — McDonnell Boehnen Hulbert & Berghoff LLP (57) ABSTRACT

A stuffing box for sealing the end of a rotatable rod is disclosed. The stuffing box includes a sleeve adapted to concentrically receive a portion of the rod therethrough and a tubular pipe concentrically arranged within the sleeve, the rod passing generally concentrically through the pipe, the pipe being in annular spaced relation to the sleeve and the rod. One or more ring seals are arranged between the pipe and the sleeve to prevent the flow of well fluids into the annulus between the sleeve and the pipe. An annular fluid chamber is defined between the sleeve and the pipe below the ring seals. During normal operation, the fluid chamber is pressurized to apply a pressure to the one or more ring seals. One or more uni-directional seals are arranged below the fluid chamber and configured to permit fluid flow into the fluid chamber.

31 Claims, 5 Drawing Sheets

FIG. 5

STUFFING BOX WITH PRESSURIZED FLUID CHAMBER AND RELATED METHODS

CROSS-REFERENCE TO RELATED APPLICATIONS

This application is a national stage application under 35 U.S.C. Å 371 of International Application No. PCT/CA2020/051795, the disclosure of which is incorporated by reference herein in its entirety.

FIELD

This application relates generally to a stuffing box for sealing the end of a rotatable rod extending from a well bore. In particular, this application relates to a stuffing box with a pressurized fluid chamber.

BACKGROUND

Stuffing boxes are used to seal the top of oil or gas producing wells. For proper operation of the stuffing box, it is important that the produced fluids and/or contaminants in the fluid being extracted from the well do not infiltrate the seals in the stuffing box. In some stuffing boxes currently available on the market, one or more ring seals, typically comprised of packing, are saturated with lubricating oil during normal operation and are compressed to a pressure exceeding the pressure of the well fluid. This may be achieved using a pressurized fluid chamber that is pressurized to a pressure exceeding the well fluid pressure under normal operations and thereby exerts a pressure on the ring seals, counteracting penetration of the produced fluid and/or contaminants from the well. The fluid chamber may include additional means for biasing against the ring seals to ensure the ring seals are compressed even if the fluid chamber pressure and well fluid pressure equalize. Embodiments of some such stuffing boxes are described in U.S. Pat. No. 6,843,313, which is hereby incorporated herein by reference in its entirety.

In some instances, well fluid pressure may spike, for example due to a blockage downstream in the extraction pipe. In some instances, additionally or instead, pressure in the fluid chamber may drop because the pump that provides pressurized lubricating fluid to the chamber malfunctions or is operating at too low a frequency. The latter may particularly occur in instances where the oil pump is driven by the same drive as the well pump and the well pump is operating at low speed.

If the well fluid pressure exceeds the pressure of the pressurized fluid chamber, as well as the means for biasing if present, this may result in a reverse pressure differential allowing well fluid to contaminate the ring seals and, in some cases, causing the ring seals to separate from each other.

SUMMARY

According to one aspect of the present disclosure, there is provided a stuffing box for sealing the end of a rotatable rod extending from a well bore, the stuffing box comprising: a sleeve adapted to concentrically receive a portion of the rod therethrough; a tubular pipe concentrically arranged within the sleeve, the rod passing generally concentrically through the pipe, the pipe being in annular spaced relation to the sleeve and the rod; one or more ring seals arranged between the pipe and the sleeve to prevent the flow of well fluids into the annulus between the sleeve and the pipe; an annular fluid chamber defined between the sleeve and the pipe below the ring seals, wherein, during normal operation, the fluid chamber is pressurized to apply a pressure to the one or more ring seals; and one or more uni-directional seals arranged below the fluid chamber configured to permit fluid flow into the fluid chamber.

According to another aspect of the present disclosure, there is provided a seal cartridge for sealing the end of a rotatable rod extending from a well bore, the cartridge comprising in stacked relationship: a static seal carrier including one or more static seals that receive the rod in normal operation; one or more ring seals; a fluid chamber to be pressurized with fluid in normal operation, the chamber including biasing means for biasing the one or more ring seals against the static seal carrier; one or more uni-directional seals that, in operation, permit fluid flow into the chamber; and a mechanical seal.

According to another aspect of the present disclosure, there is provided a method for maintaining compression of one or more ring seals of a stuffing box for sealing the end of a rotatable rod extending from a well bore, the method comprising: arranging the one or more ring seals vertically between a vertically stationary upper support and a vertically movable lower support; arranging a fluid chamber below the movable support, the fluid chamber configured to exert a pressure on the movable support to compress the one or more ring seals; pressurizing fluid in the fluid chamber to a pressure matching or exceeding an expected pressure of the well fluid; and increasing the pressure in the fluid chamber in response to an increase in the pressure of the well fluid.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there is shown in the drawings illustrative embodiments of the disclosure. It should be understood, however, that the application is not limited to the precise arrangements and instrumentalities shown. In the drawings.

DETAILED DESCRIPTION

Referring to FIGS. 1-4, interior components of a drive head according to embodiments of the present disclosure are shown. Housing 10 includes and supports multiple components arranged in a known manner, including oil pump 12 and stuffing box sleeve 14, which drives gear 16 by way of a gear train (not shown) run by a motor (not shown). The driven gear 16 in turn drives the oil pump 12 via pinion gear 18.

The housing 10 supports sleeve 14 that drives and seals a drive rod (not shown), generally known as a "polished rod", which extends downward below the drive head and rotationally or axially drives a drive string to run an artificial lift pump located at the bottom of the installation to produce well fluids to the surface.

In particular, at its upper end, the sleeve 14, is coupled to a drive cap 20, which in turn is coupled to the rod via clamping ring 22.

A tubular standpipe 24 is arranged concentrically within sleeve 14 and annularly spaced therefrom. The rod passes generally concentrically through the standpipe 24, the standpipe 24 being annularly spaced from the rod. Hardened wear sleeve 26 is arranged concentrically outward of the standpipe 24, is in contact therewith and is coupled thereto. An upper end of the wear sleeve 26 extends beyond an upper end of the standpipe 24 while a lower end of the wear sleeve 26 is received by tubular intermediate support 28, which in turn is arranged concentrically outward of the standpipe 24 and in spaced relation to the sleeve 14 without contacting the sleeve 14.

Static seal carrier 30 is arranged concentrically within and coupled to the sleeve 14 and spaced from the rod. Static seals 32 are carried by an annular ledge 34 of the static seal carrier 30 and form a seal between the static seal carrier 30 and the rod. O-rings 36 form a seal between the static seal carrier 30 and the sleeve 14.

Ring seals 38, in some embodiments packing, are arranged concentrically within the sleeve 14 below the static seal carrier 30 and abut a bottom surface of the static seal carrier 30. The ring seals 38 form a dynamic seal between the stationary wear sleeve 26 and the rotating sleeve 14.

A ring seal seat 40 is arranged concentrically within the sleeve 14 and below the ring seals 38, providing support to the ring seals 38. Specifically, the ring seal seat 40 has a generally L-shaped cross-section, with a horizontal portion 42 acting as a seat for the ring seals 38 and a generally vertical portion 44 extending downward proximate, but without contacting the wear sleeve 26.

An annular fluid chamber 46 is defined below the ring seal seat 40 and between the wear sleeve 26 and the sleeve 14. The ring seal seat 40 defines an upper boundary of the fluid chamber 46. In particular, the horizontal portion 42 of the ring seal seat 40 defines an upper boundary with the vertical portion 44 of the ring seal seat 40 extending downward into the chamber 46.

A lower boundary of the fluid chamber 46 is defined by a first adaptor ring 48. Specifically, the first adaptor ring 48 includes seat portion 50 that generally spans the space from the wear sleeve 26 to the sleeve 14 horizontally without contacting the wear sleeve 26, the seat portion 50 generally defining the lower boundary of the fluid chamber 46. Annular sealing wall 52 extends downward from the seat portion 50 generally concentric with and spaced from the wear sleeve 26 and the sleeve 14, forming annular gaps on both the outer and inner sides of the sealing wall 52. The outer annular gap is occupied by O-ring 54 to seal between the sealing wall 52 and the sleeve 14.

Biasing means 55, a compression spring in the illustrated embodiment, is arranged within the fluid chamber 46 and biases the ring seal seat 40 upwards against the ring seals 38. Thus, the ring seals 38 are compressed between the ring seal seat 40 and the static seal carrier 30.

More generally, the ring seals are compressed between a vertically stationary support, such as the static seal carrier in the illustrated embodiment, and a vertically movable support, such as the ring seal seat 40 in the illustrated embodiment.

A first uni-directional seal 56 is arranged in the inner annular gap formed by sealing wall 52. The first uni-directional seal 56 is configured to permit fluid, such as lubricating oil, to flow upward into the fluid chamber 46. For example, in the illustrated embodiment, the first uni-directional seal 56 is configured as a U-cup seal loaded with coil spring 58. Fluid is permitted to flow on an inner side of the first seal 56 between the first seal 56 and the wear sleeve 26. On an outer side of the first seal 56, the first seal 56 includes an outwardly extending annular flange 60 that extends below and seals under the sealing wall 52. The flange 60 serves to retain the uni-directional seal 56 in position.

A second adaptor ring 62 is arranged below the first adaptor ring 48 and the first uni-directional seal 56. Coupling extension 64 extends downward from the first adaptor ring 48, contacting the sleeve 14 and includes a threaded internal surface, which is threadingly coupled an outer surface on the sealing wall 70 of the second adaptor ring 62. Seat portion 72 of the second adaptor ring 62 spans the space from the coupling extension 64 to the wear sleeve 26, without contacting the wear sleeve 26. The seat portion 72 provides a seat for the first uni-directional seal 56, including for the flange 60.

A second uni-directional seal 74, identical to the first uni-directional seal 56 in the illustrated embodiment and loaded with coil spring 76, is arranged and forms a seal between the sealing wall 70 and the wear sleeve 26. The second uni-directional seal includes flange 78 that seals under the sealing wall 70. The flange 78 serves to retain the uni-directional seal 74. The uni-directional seal 74 permits fluid flow upward between the seal 74 and the wear sleeve 26.

A mechanical seal 80 is arranged below the second adaptor ring 62 between the sleeve 14 and the wear sleeve 26. The mechanical seal 80 rests on inwardly projecting annular ledge 82 of the sleeve 14. Coupling extension 84 extends downward from the second adaptor ring 62 and includes a threaded internal surface, which is threadingly coupled to an outer surface of the mechanical sleeve 80. O-ring 88 is positioned within a groove of the mechanical seal 80 to form a seal with the sleeve 14.

Other arrangements of the above-noted components are possible. For example, in some embodiments one or more of the adaptor rings 48 and 62 may be coupled to each other and the mechanical seal 80 without threading engagement, e.g. by press fitting the components.

Moreover, while coil springs are used to load the U-cup seals in the illustrated embodiment, other means are possible such as cantilever springs, O-rings and the like.

In normal operation, during startup of the well installation, a lubricating fluid, such as oil, is fed from the oil pump through an oil filter via channels formed in a surface of the standpipe 24 upwards behind the intermediate support pipe 28 and the wear sleeve 26. The channels fluidly communicate with aperture 92 in the wear sleeve 26, permitting lubricating fluids to flow onto an interior of the mechanical seal below both uni-directional seals 56, 74. Under pressure, the lubricating fluids flow upward along an outer surface of the wear sleeve 26 past both the second adaptor ring 62 and uni-directional seal 74, as well as past first adaptor ring 48 and uni-directional seal 56 into the fluid chamber 46. The lubricating fluid fills the fluid chamber 46 as well as the voids and spaces surrounding seals 56 and 74. Under pressure, the lubricating fluid also flows upwards along the wear sleeve 26 past the vertical portion 44 of the ring seal seat 40 and lubricates the interface between the ring seals 38 and the wear sleeve 26. In the case of packing, the lubricating fluid saturates the packing.

Furthermore, one or more apertures 94 in the seat portion 50 of the first adaptor ring 48 also permits fluid communication between the fluid chamber 46 and the inner annular gap in which the uni-directional seal 54 is arranged.

The lubricating fluid, and thus the fluid chamber 46, is pressurized to a pressure at least matching but typically exceeding the well fluid pressure. In this manner, during normal operation, well fluid and, in particular, contaminants in the well fluid are prevented from contaminating the ring seals 38.

In the event of a spike in well fluid pressure that would exceed both the pressure of the fluid chamber 46 and that of the biasing means 55, when present, a compressive force would be applied to the fluid chamber 46. This would result in ring seal seat 40 instead applying compression to the fluid chamber 46 instead of vice versa. Due to at least the presence of the one or more apertures 94, fluid would be forced into the uni-directional seal 56, pressurizing it and expanding both lips of the seal, preventing fluid from flowing back down past the seal 56, towards sleeve 14 or towards sealing wall 52. In particular, given the relatively larger area for fluid flow through the apertures 94, upon compression of the fluid chamber 46, the lubricating fluid flow through the apertures 94 is greater than along the wear sleeve 26, resulting in a pressure applied to and spreading of the lips of the uni-directional seal 56.

The uni-directional seal 76 acts as a backup to the uni-directional seal 56 in the event some pressurized fluid does escape fluid chamber 46 past the first unit-directional seal 56.

Accordingly, by having a substantially incompressible lubricating fluid "locked" in the fluid chamber 46, the chamber experiences a build up of hydraulic pressure to counteract the spike in the well fluid pressure, maintaining compression of the ring seal 38.

While the principles of the present disclosure have been described with respect to the illustrated embodiment, other embodiments are also within the scope of the present disclosure.

For example, the above descried flow path of lubricating fluid may be present in embodiments involving a top mounted stuffing box, particularly on a progressive cavity pump drive head. Alternatively, the stuffing box could be made as a stand-alone unit intended to mount under a drive head or as the stuffing box in other artificial lift forms such as a reciprocating rod pump. In such embodiments, an external pressure system would be used that is not driven by the stuffing box components, eliminating the use for the flow path. In such embodiments, lubricating fluid may be pumped directly into the fluid chamber, for example.

In some embodiments, there may be only a single uni-directional seal arranged below the fluid chamber, such that the first adaptor ring is coupled directly to the mechanical seal. In some embodiments, the specific placement and/or configuration of the uni-directional seals and/or adaptor rings may be different such that the placement of the uni-directional seals differ from that illustrated. In some embodiments, a different type of uni-directional seal may be employed and/or another mechanism for permitting uni-directional flow may be used.

In some embodiments, flanges 60 and 78 may be omitted and other configurations may be used to retain the uni-directional seal(s). While in the illustrated embodiment the uni-directional seals are actuated by coil springs, other types of springs or materials may be used to actuate or prime the lips of the seals. Alternatively, the lips could support themselves, depending on the material used.

More generally, while the illustrated embodiment shows a U-cup seal, any lip seal permitting flow in one direction (i.e. towards the fluid chamber) may be implemented. There could be sing or multiple lip seals (of a same or different type) acting in one direction. In the illustrated embodiment, the two lips of each uni-directional seal form a seal with the dynamic side (i.e. against the wear sleeve) and the static side (i.e. against the respective sealing wall). The static side could instead be sealed with a press fit steel housing on the seal or with an elastomer (or otherwise) coated seal.

In some embodiments, the fluid connection between the fluid chamber and the uni-directional seals may be different than in the illustrated embodiment. For example, instead of or in addition to apertures in the seat portion of the first adaptor ring, other fluid communication channels may be provided.

The above-described components within the sleeve 14 that function to seal the polished rod may be considered to be and referred to as the drive head's stuffing box.

Other elements of the stuffing box may also be varied within the scope of the present disclosure. For example, in some embodiments the wear sleeve may be omitted, with an outer surface of the standpipe acting as the outer surface of the wear sleeve in the above description. In such and other embodiments, alternative flow channels for the lubricating fluid may be provided to ensure proper lubricating fluid flow to desired locations.

Conversely, in some embodiments, additional tubular elements may be included as part of the standpipe or as the outer surface along which the lubricating fluid flows in normal operation, while continuing to permit uni-directional fluid flow into the fluid chamber.

It is also noted that the terms vertical, above, below, top, bottom, upwards, and downwards are not intended to be limiting but are used to describe relative orientation during normal operation when the stuffing box is installed at the top of a well head. It is understood that the terms are arbitrary and could be reversed and still be within the scope of the present disclosure.

Other embodiments are possible. The principles of the present disclosure may be applied to other types of artificial lift installations for oil and gas producing wells, including, but not limited to, installations using an axially reciprocating rod seal stuffing box.

Furthermore, while in the illustrated embodiment the sleeve is a rotating or rotatable component and the standpipe is stationary, the principles of the present disclosure apply to configurations with a stationary sleeve and rotating interior pipe as well.

In some embodiments, above-described components of the drive head may be manufactured and/or assembled as a separate cartridge which is installed in the drive head to function as a stuffing box. This may allow for easy replacement and/or servicing in the event of contamination or other damage. In such embodiments, a cartridge may include, in stacked relationship:
- a static seal carrier including one or more static seals that receive the rod in normal operation;
- one or more ring seals;
- a fluid chamber to be pressurized with fluid in normal operation, the chamber including biasing means for biasing the one or more ring seals against the static seal carrier;

one or more uni-directional seals that, in operation, permit fluid flow into the chamber; and a mechanical seal.

In some embodiments, the cartridge may be manufactured and/or sold as a separate component including the above noted sub-components. For example, an outer sleeve, such as the sleeve 14, may be provided to contain the components of the cartridge. In yet other embodiments, a further containment may be provided outside of the sleeve 14 to provide a secondary containment. The housing of the drive head may be configured differently than shown in the illustrated embodiment to accommodate and/or operably receive the cartridge, e.g. to support the sleeve and/or additional outer containment.

Figure 1:
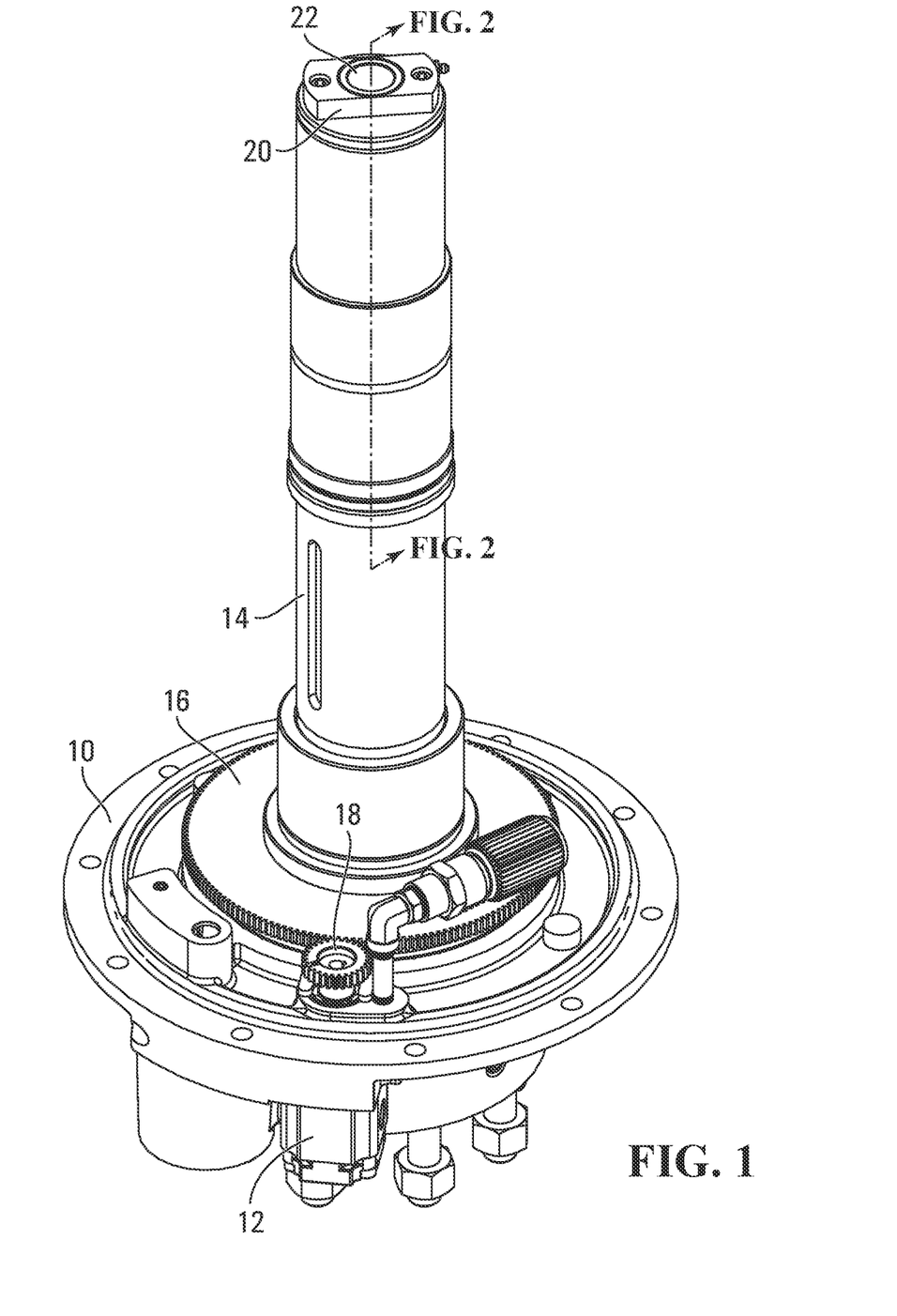
FIG. 1 is a perspective view of interior portions of a drive head for a progressive cavity pump according to embodiments of the present disclosure.
Figure 2:
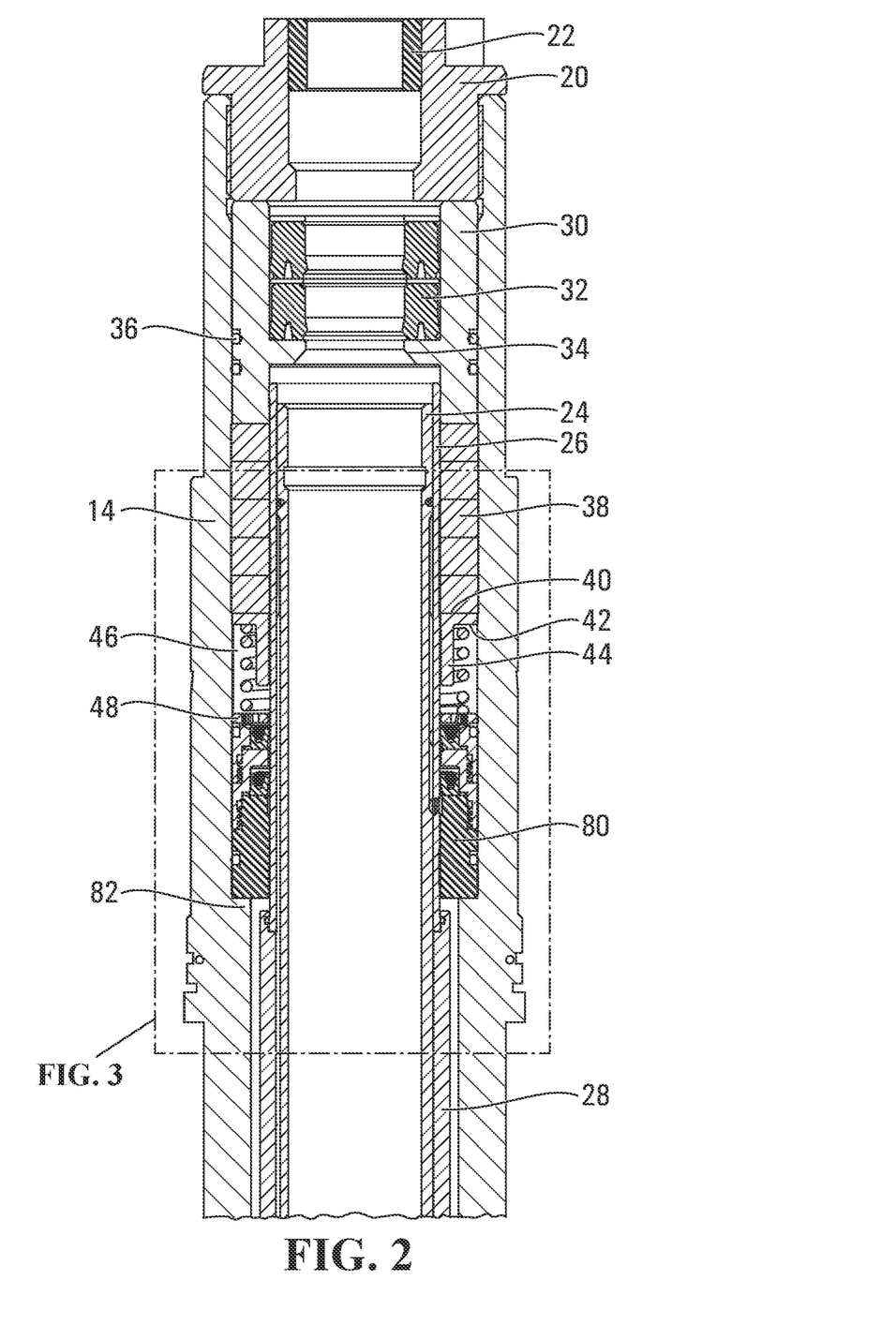
FIG. 2 is a partial cross-sectional view taken along lines 2-2 in FIG. 1.
Figure 3:
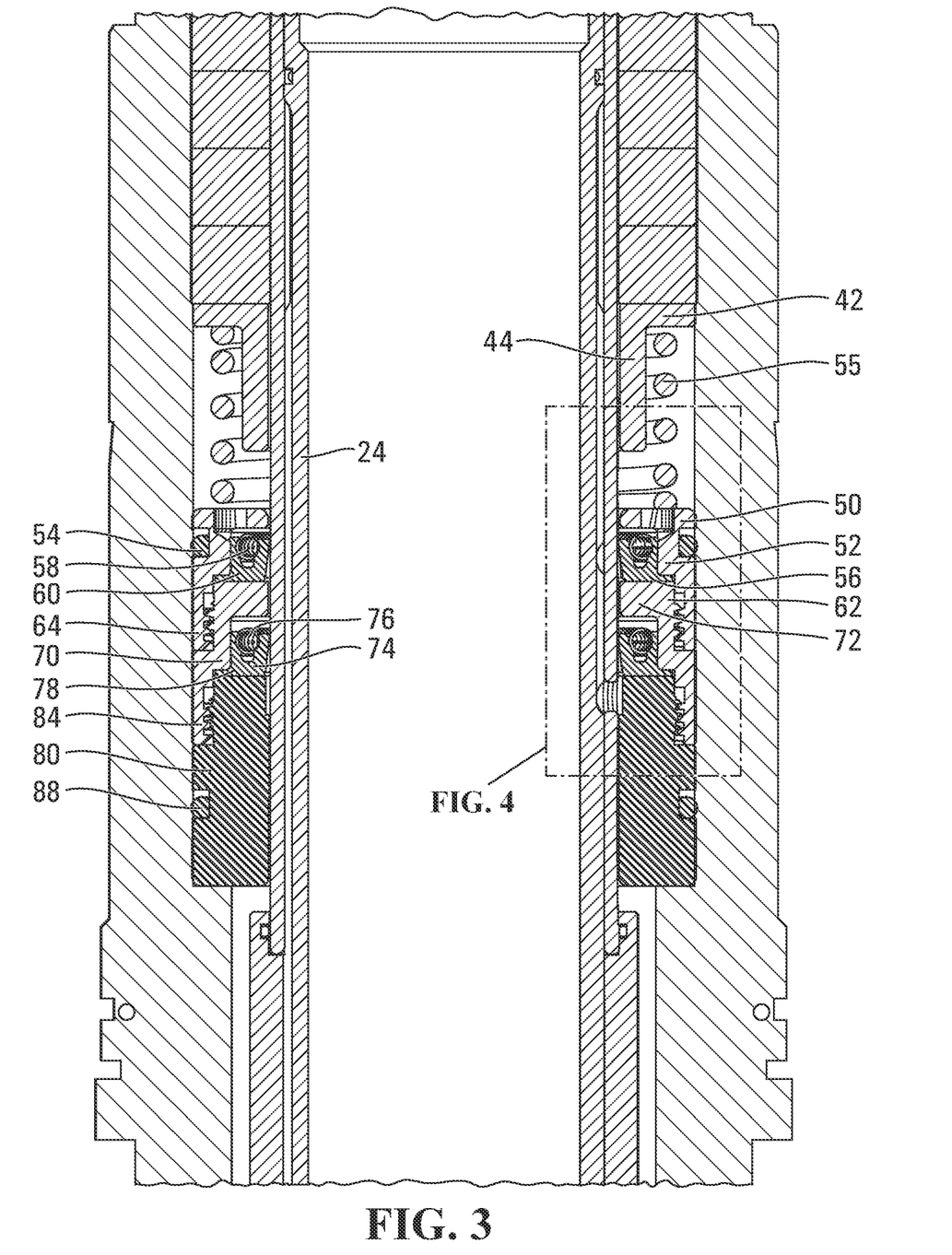
FIG. 3 is enlarged view of the portion indicated in FIG. 2.
Figure 4:
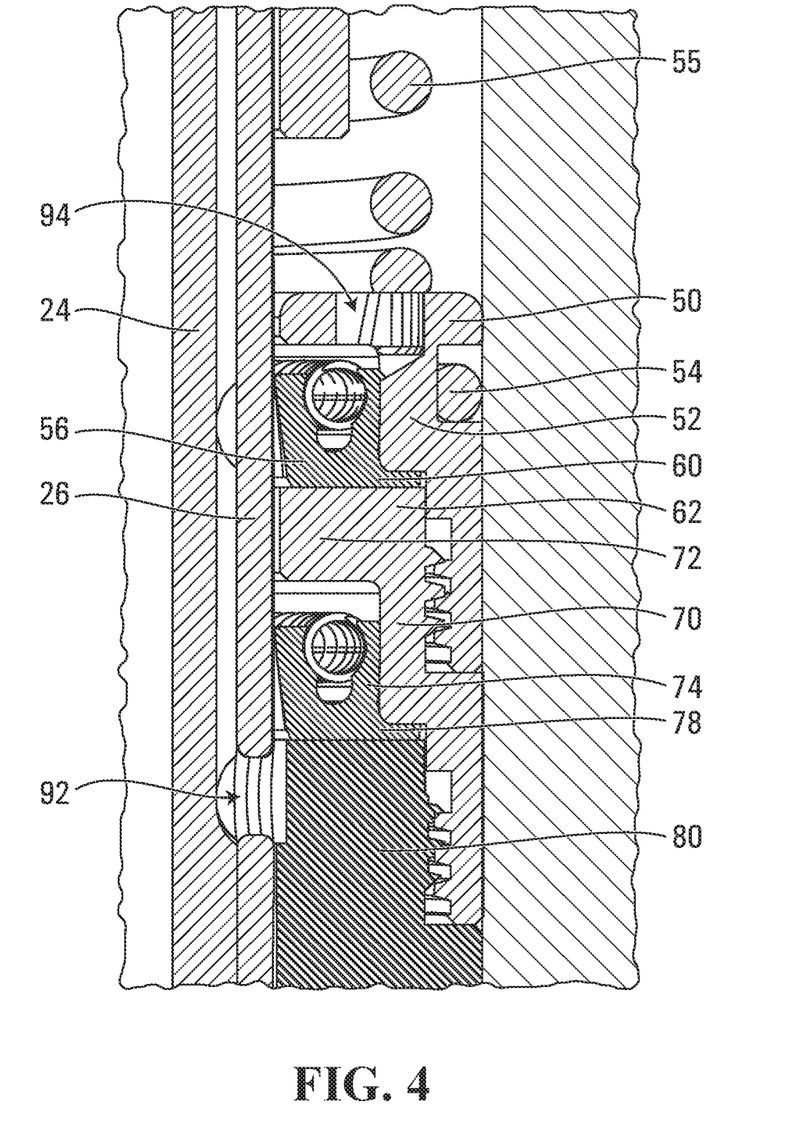
FIG. 4 is an enlarged view of the portion indicated in FIG. 3.
Figure 5:
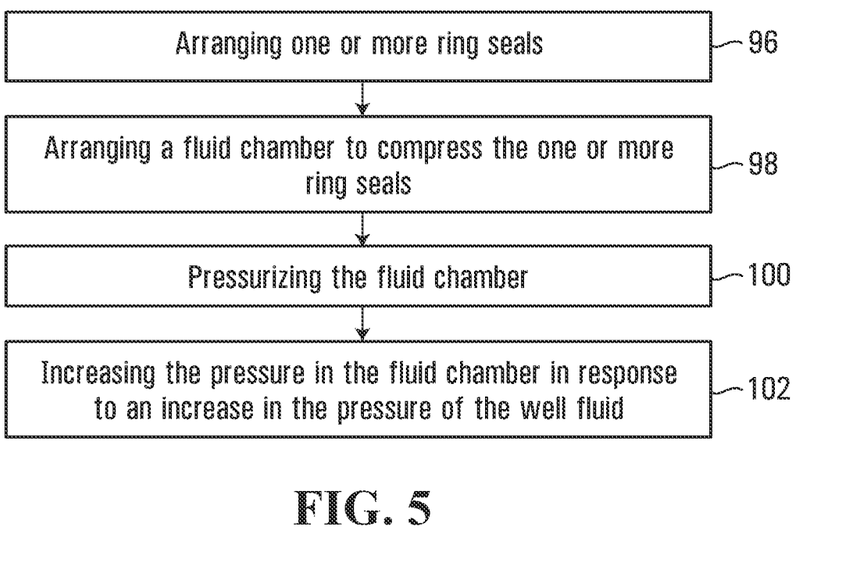
FIG. 5 is a schematic showing steps of a method according to embodiments of the present disclosure.

Methods are also within the present disclosure. Referring to FIG. 5, according to embodiments of the present disclosure, there is provided a method for maintaining compression of one or more ring seals of a stuffing box for sealing the end of a rotatable rod extending from a well bore. At 96, the method includes arranging the one or more ring seals. This may include arranging the one or more ring seals vertically between a vertically stationary upper support and a vertically movable lower support. For example, this may include installing a stuffing box between the static seal carrier, which is vertically stationary and fixed to the sleeve, and the ring seal seat which is vertically movable and biased towards the ring seals. Other embodiments are also possible.

At 98, the method includes arranging a fluid chamber to compress the one or more ring seals. This may include arranging the fluid chamber below the movable support, the fluid chamber configured to exert a pressure on the movable support to compress the one or more ring seals. For example, this may include having the ring seal seat define an upper boundary of the fluid chamber so that fluid in the chamber exerts pressure on the vertically movable seal seat.

At 100, the method includes pressurizing the fluid chamber. This may include pressurizing fluid in the fluid chamber to a pressure matching or exceeding an expected pressure of the well fluid under normal operations. For example, this may include pumping lubricating oil into the fluid chamber until a desired pressure is reached.

At 102, the method includes increasing the pressure in the fluid chamber in response to an increase in the pressure of the well fluid. This may include either passively or actively increasing the pressure in the fluid chamber. For example, this may include actively or passively fluidly locking or sealing the chamber such that compression of the chamber results in an increase in chamber pressure.

In some embodiments, increasing the pressure in the fluid chamber includes preventing fluid from escaping the fluid chamber when the pressure of the well fluid exceeds the pressure of the fluid chamber.

In some embodiments, the method also includes arranging one or more uni-directional seals below the fluid chamber, the one or more uni-directional seals being configured to permit fluid flow into the fluid chamber.

In some embodiments, increasing the pressure in the fluid chamber comprises pumping additional fluid into the fluid chamber. For example, this may include using a mechanical or electronic controller to monitor and control the fluid pump to pump additional fluid into the chamber when an increase in well fluid pressure is detected and/or when a predetermined threshold is reached or exceeded.

In some embodiments, the method further includes arranging a biasing means within the fluid chamber to bias the movable support against the one or more ring seals. For example, this may include arranging a compression spring in the fluid chamber to exert a biasing force against the movable support, such as the ring seal seat.

Other embodiments are possible.

Numerous specific details have been set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms "comprises," "comprising," "includes," "including," "has," "having" or any other variation thereof, are intended to cover a nonexclusive inclusion. For example, a composition, a process, method, article, or apparatus that comprises a list of elements is not necessarily limited to only those elements but may include other elements not expressly listed or inherently present therein.

As used herein the terms "approximately," "about," "substantially" and variations thereof are intended to include not only the exact value qualified by the term, but to also include some slight deviations therefrom, such as deviations caused by measuring error, manufacturing tolerances, wear and tear on components or structures, stress exerted on structures, and combinations thereof, for example.

Use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Moreover, it will be understood that features of one embodiment may be combined with features of other embodiments, even if not expressly recited or described as a combination.

The invention claimed is:

1. A stuffing box for sealing the end of a rotatable rod extending from a well bore, the stuffing box comprising:
 a sleeve adapted to concentrically receive a portion of the rod therethrough;
 a tubular pipe concentrically arranged within the sleeve, the rod passing generally concentrically through the pipe, the pipe being in annular spaced relation to the sleeve and the rod;
 one or more ring seals arranged between the pipe and the sleeve to prevent the flow of well fluids into the annulus between the sleeve and the pipe;
 an annular fluid chamber defined between the sleeve and the pipe below the ring seals, wherein, during normal operation, the fluid chamber is pressurized to apply a pressure to the one or more ring seals; and
 one or more uni-directional seals arranged below the fluid chamber configured to permit fluid flow into the fluid chamber, wherein the one or more uni-directional seals includes a U-cup seal.

2. The stuffing box according to claim 1, wherein a biasing means is arranged in the fluid chamber to further apply pressure to the one or more ring seals.

3. The stuffing box according to claim 1, further comprising a seal carrier concentrically arranged within the sleeve, the seal carrier receiving an upper end of the pipe, wherein, during normal operation, the one or more ring seals are compressed against the seal carrier.

4. The stuffing box according to claim 1, further comprising an annular ring seal seat defining an upper boundary of the fluid chamber, wherein, during normal operation, pressure in the fluid chamber presses the ring seal seat against the one or more ring seals.

5. The stuffing box according to claim 1, wherein the one or more ring seals comprise packing.

6. The stuffing box according to claim 1, wherein, in operation, one of the sleeve and the pipe rotates and the other of the sleeve and the pipe is stationary.

7. The stuffing box according to claim 1, wherein the sleeve comprises at least one aperture for allowing fluid to be pumped into the fluid chamber during startup of the well bore, and wherein the at least one aperture is positioned below the one or more uni-directional seals.

8. The stuffing box for sealing an end of a rotatable rod extending from a well bore, the stuffing box comprising:
    a sleeve adapted to concentrically receive a portion of the rod therethrough;
    a tubular pipe concentrically arranged within the sleeve, the rod passing generally concentrically through the pipe, the pipe being in annular spaced relation to the sleeve and the rod;
    one or more ring seals arranged between the pipe and the sleeve to prevent the flow of well fluids into an annulus between the sleeve and the pipe;
    an annular fluid chamber defined between the sleeve and the pipe below the ring seals, wherein, during normal operation, the fluid chamber is pressurized to apply a pressure to the one or more ring seals; and
    one or more uni-directional seals arranged below the fluid chamber configured to permit fluid flow into the fluid chamber, wherein a mechanical seal is concentrically arranged between the sleeve and the pipe and below the one or more uni-directional seals.

9. The stuffing box according to claim 8, wherein the sleeve comprises at least one aperture for allowing fluid to be pumped into the fluid chamber during startup of the well bore, and wherein the at least one aperture is positioned below the one or more uni-directional seals.

10. The stuffing box for sealing an end of a rotatable rod extending from a well bore, the stuffing box comprising:
    a sleeve adapted to concentrically receive a portion of the rod therethrough;
    a tubular pipe concentrically arranged within the sleeve, the rod passing generally concentrically through the pipe, the pipe being in annular spaced relation to the sleeve and the rod;
    one or more ring seals arranged between the pipe and the sleeve to prevent the flow of well fluids into an annular between the sleeve and the pipe;
    an annular fluid chamber defined between the sleeve and the pipe below the ring seals, wherein, during normal operation, the fluid chamber is pressurized to apply a pressure to the one or more ring seals; and
    one or more uni-directional seals arranged below the fluid chamber configured to permit fluid flow into the fluid chamber, wherein an adaptor ring is concentrically arranged between the sleeve and the pipe, the adaptor ring having a seat portion defining a lower boundary of the fluid chamber and a sealing wall extending downward from the seat portion, the sealing wall being spaced from the pipe defining an annular gap therebetween.

11. The stuffing box according to claim 10, wherein a uni-directional seal of the one or more uni-direction seals is arranged to occupy and seal the annular gap.

12. The stuffing box according to claim 11, wherein the uni-directional seal includes a flange extending away from the pipe to seal an area below the sealing wall.

13. The stuffing box according to claim 11, wherein the seat portion includes one or more apertures for fluidly connecting the fluid chamber to the annular gap.

14. The stuffing box according to claim 10, wherein the sleeve comprises at least one aperture for allowing fluid to be pumped into the fluid chamber during startup of the well bore, and wherein the at least one aperture is positioned below the one or more uni-directional seals.

15. The stuffing box for sealing an end of a rotatable rod extending from a well bore, the stuffing box comprising:
    a sleeve adapted to concentrically receive a portion of the rod therethrough;
    a tubular pipe concentrically arranged within the sleeve, the rod passing generally concentrically through the pipe, the pipe being in annular spaced relation to the sleeve and the rod;
    one or more ring seals arranged between the pipe and the sleeve to prevent the flow of well fluids into an annulus between the sleeve and the pipe;
    an annular fluid chamber defined between the sleeve and the pipe below the ring seals, wherein, during normal operation, the fluid chamber is pressurized to apply a pressure to the one or more ring seals; and
    one or more uni-directional seals arranged below the fluid chamber configured to permit fluid flow into the fluid chamber, wherein, in operation, each of the one or more uni-directional seals provides a dynamic seal.

16. The stuffing box according to claim 15, wherein the sleeve comprises at least one aperture for allowing fluid to be pumped into the fluid chamber during startup of the well bore, and wherein the at least one aperture is positioned below the one or more uni-directional seals.

17. The stuffing box for sealing an end of a rotatable rod extending from a well bore, the stuffing box comprising:
    a sleeve adapted to concentrically receive a portion of the rod therethrough;
    a tubular pipe concentrically arranged within the sleeve, the rod passing generally concentrically through the pipe, the pipe being in annular spaced relation to the sleeve and the rod;
    one or more ring seals arranged between the pipe and the sleeve to prevent the flow of well fluids into an annulus between the sleeve and the pipe;
    an annular fluid chamber defined between the sleeve and the pipe below the ring seals, wherein, during normal operation, the fluid chamber is pressurized to apply a pressure to the one or more ring seals; and
    one or more uni-directional seals arranged below the fluid chamber configured to permit fluid flow into the fluid chamber, wherein, in operation, each of the one or more uni-directional seals provides a dynamic seal on a radially inner side and a static seal on a radially outer side.

18. The stuffing box according to claim 17, wherein the sleeve comprises at least one aperture for allowing fluid to be pumped into the fluid chamber during startup of the well bore, and wherein the at least one aperture is positioned below the one or more uni-directional seals.

19. A seal cartridge for a stuffing box for sealing an end of a rotatable rod extending from a well bore, the cartridge comprising in stacked relationship:

a static seal carrier including one or more static seals that receive the rod in normal operation;

one or more ring seals;

a fluid chamber to be pressurized with fluid in normal operation, the chamber including biasing means for biasing the one or more ring seals against the static seal carrier;

one or more uni-directional seals that, in operation, permit fluid flow into the chamber, wherein the one or more uni-directional seals include a U-cup seal; and a mechanical seal.

20. The cartridge of according to claim 19, wherein an annular ring seal seat defines an upper boundary of the fluid chamber.

21. The cartridge according to claim 19, wherein the one or more ring seals comprise packing.

22. The cartridge according to claim 19, further comprising an outer sleeve for containing components of the cartridge.

23. The seal cartridge according to claim 19, further comprising an inner sleeve, wherein the inner sleeve comprises at least one aperture for allowing fluid to be pumped into the fluid chamber during startup of the well bore, and wherein the at least one aperture is positioned below the one or more uni-directional seals.

24. The cartridge cartridge for a stuffing box for sealing an end of a rotatable rod extending from a well bore, the cartridge comprising in stacked relationship:

a static seal carrier including one or more static seals that receive the rod in normal operation;

one or more ring seals;

a fluid chamber to be pressurized with fluid in normal operation, the chamber including biasing means for biasing the one or more ring seals against the static seal carrier;

one or more uni-directional seals that, in operation, permit fluid flow into the chamber; and a mechanical seal, wherein an adaptor ring is arranged between the fluid chamber and the mechanical seal, the adaptor ring having a seat portion defining a lower boundary of the fluid chamber and a sealing wall extending downward from the seat portion, the sealing wall defining an annular space on an interior of the sealing wall.

25. The cartridge according to claim 24, wherein a uni-directional seal of the one or more uni-direction seals is arranged to occupy and seal the annular space.

26. The cartridge according to claim 25, wherein the uni-directional seal includes a flange to seal an area below the sealing wall.

27. The cartridge according to claim 24, wherein the seat portion includes one or more apertures for fluidly connecting the fluid chamber to the annular space.

28. The seal cartridge according to claim 24, further comprising an inner sleeve, wherein the inner sleeve comprises at least one aperture for allowing fluid to be pumped into the fluid chamber during startup of the well bore, and wherein the at least one aperture is positioned below the one or more uni-directional seals.

29. A method for maintaining compression of one or more ring seals of a stuffing box for sealing an end of a rotatable rod extending from a well bore, the method comprising:

arranging the one or more ring seals vertically between a vertically stationary upper support and a vertically movable lower support;

arranging a fluid chamber below the movable support, the fluid chamber configured to exert a pressure on the movable support to compress the one or more ring seals;

pressurizing fluid in the fluid chamber to a pressure matching or exceeding an expected pressure of the well fluid; and preventing fluid from escaping the fluid chamber when the pressure of the well fluid exceeds the pressure of the fluid chamber, wherein preventing fluid from escaping the fluid chamber comprises arranging one or more uni-directional seals below the fluid chamber, the one or more uni-directional seals being configured to permit fluid flow into the fluid chamber, and arranging at least one aperture for allowing fluid to be pumped into the fluid chamber during startup of the well bore below the one or more uni-directional seals.

30. The method of claim 29, further comprising pumping additional fluid into the fluid chamber.

31. The method of claim 29, further comprising arranging a biasing means within the fluid chamber to bias the movable support against the one or more ring seals.

* * * * *

UNITED STATES PATENT AND TRADEMARK OFFICE
CERTIFICATE OF CORRECTION

Page 1 of 1

PATENT NO. : 12,180,799 B2
APPLICATION NO. : 17/754750
DATED : December 31, 2024
INVENTOR(S) : Ross Willard Senger It is certified that error appears in the above-identified patent and that said Letters Patent is hereby corrected as shown below:

On the Title Page

Item (22) section should read:
PCT Filed: Dec. 23, 2020
PCT No.: PCT/CA2020/051795
§ 371(c)(1), (2) Date: April 11, 2022
PCT Pub. No.: WO2022/133570
PCT Pub. Date: Jun. 30, 2022

Signed and Sealed this
Seventeenth Day of June, 2025

Coke Morgan Stewart
*Acting Director of the United States Patent and Trademark Office*